United States Patent [19]

Takamiya et al.

[11] Patent Number: 5,482,742

[45] Date of Patent: Jan. 9, 1996

[54] METHOD FOR REDUCING GREEN ROUGHNESS OF A BRAKE SYSTEM DURING WEAR-IN PERIOD

[75] Inventors: Minoru Takamiya, Novi; Toshiro Miyazaki; Yosuke Sasaki, both of W. Bloomfield, all of Mich.

[73] Assignee: Akebono Brake Systems Engineering Center, Inc., Farmington Hills, Mich.

[21] Appl. No.: 96,476

[22] Filed: Jul. 22, 1993

[51] Int. Cl.$^6$ ..................................................... B05D 5/08
[52] U.S. Cl. ..................... 427/156; 188/251 A; 427/421; 427/388.4
[58] Field of Search .................................. 427/154, 155, 427/156, 11, 388.4, 421, 388.2; 188/251 A; 524/406; 523/149, 152, 155, 516

[56] References Cited

U.S. PATENT DOCUMENTS

| | | | |
|---|---|---|---|
| 1,964,671 | 6/1934 | Nesbitt | 427/11 |
| 3,307,969 | 3/1967 | Quinn | 117/126 |
| 3,337,938 | 8/1967 | Prasse . | |
| 3,526,306 | 9/1970 | Bentz et al. | 192/107 |
| 3,553,007 | 12/1970 | Hennig | 427/11 |
| 3,585,102 | 6/1971 | Burgess | 188/251 M |
| 3,899,050 | 8/1975 | Savary et al. | 188/251 A |
| 3,998,301 | 12/1976 | Morse et al. | 188/251 A |
| 4,002,592 | 1/1977 | Baskin | 106/36 |
| 4,105,473 | 8/1978 | Anderson et al. | 427/11 |
| 4,110,512 | 8/1978 | Roy et al. | 427/11 |
| 4,130,537 | 12/1978 | Bohrer | 260/38 |
| 4,137,214 | 1/1979 | Sochalski | 260/38 |
| 4,197,223 | 4/1980 | Bartram | 188/251 A |
| 4,256,591 | 3/1981 | Yamamoto et al. | 252/12 |
| 4,432,922 | 2/1984 | Kaufman et al. | 264/119 |
| 4,502,581 | 3/1985 | Komatsu | 427/11 |
| 4,537,823 | 8/1985 | Tsang et al. | 428/308.4 |
| 4,811,818 | 3/1989 | Jamison | 427/11 |
| 4,900,579 | 2/1990 | Lee et al. | 427/11 |
| 5,083,650 | 1/1992 | Seiz et al. | 188/251 A |

FOREIGN PATENT DOCUMENTS

| | | | |
|---|---|---|---|
| 181616 | 5/1986 | European Pat. Off. | 188/251 A |
| 1048593 | 1/1980 | Japan . | |
| 3125038 | 5/1991 | Japan | 188/251 A |

OTHER PUBLICATIONS

Translation of JP 3-125038, May 1991.

*Primary Examiner*—Diana Dudash
*Attorney, Agent, or Firm*—Weintraub DuRoss & Brady

[57] ABSTRACT

A method for reducing green roughness of a braking system and a method of manufacturing a brake system includes coating at least one of the components of the brake system with a boundary layer material. The method is applicable to either the pad of a disc brake system or the brake drum lining and/or the brake shoe of a brake drum system. The coating is either a binder, a filler, a boundary layer lubricant or a mixture thereof. The coating hereof is either graphite, molybdenum disulfide and/or a divalent fluoride, either organic or inorganic. Likewise, a thermoset paint such as an alkyd resin, phenolic resin, epoxy resin or the like can be used for the coating material. The coating eliminates uneven transfer of friction material during the brake wear-in period which creates brake torque vibration which, in turn, increases vehicle sensitivity and brake roughness.

11 Claims, 1 Drawing Sheet

METHOD FOR REDUCING GREEN ROUGHNESS OF A BRAKE SYSTEM DURING WEAR-IN PERIOD

BACKGROUND OF THE INVENTION

I. Field of the Invention

The present invention relates to vehicular brake systems. More particularly, the present invention relates to a method for reducing green roughness during the break- or wear-in period. Even more particularly, the present invention concerns means and methods for coating vehicular brake component(s) with a boundary layer transfer material for reducing brake roughness or shudder during the wear-in period.

II. Description of the Relevant Art

As is known to those skilled in the art to which the present invention pertains, there are two basic kinds of vehicular brake systems. One type is the drum and shoe type brake system. In this system, a brake shoe is actuated against a brake lining on the interior of a brake drum to slow and stop the vehicle. The kinetic energy of the vehicle is transformed into heat energy by the friction which occurs at the brake linings. The brake drum, therefore, becomes heated. Thus, provision must be make to remove as much heat as possible. If the heat is not removed, the brake drum will expand and possibly enlarging so much that the shoe will not engage the brake lining on the interior of the brake drum. While this type of system has long been in use, the art has turned to the disc brake system.

In this latter system, there is a brake disc, which comprises a rotor and pads. The pads are fixed pads, comprising a friction material, which engage opposite sides of the rotor to stop the vehicle. The operation of such systems is well-known to the skilled artisan.

Regardless of the type of system, it has long been observed that there is an uneven transfer of friction material between the components during the break-in period. This increases brake torque vibration and vehicle sensitivity. Consequently, there is a sensation of brake roughness which the driver feels when braking, during the wear-in period. This phenomenon is commonly referred to as "green roughness".

While the operation of a braking system of a vehicle is well-known, the understanding of braking performance, per se, is not well understood. The criteria for selecting a braking system for any given vehicle is complex and involves a wide range of testing including mounting, durability, noise and roughness evaluations. Yet, regardless of the selected system, the roughness or shudder, which occurs at the rubbing surface between the friction material and the mating surface, such as the brake rotor, is a problem the art has sought to alleviate.

In most applications, the mating surface, e.g. the rotor is gray cast iron and the friction material e.g. the pad lining, is usually, a composite material, generally comprising a binder resin, organic and inorganic fillers and a reinforcing fiber. The composition of both the friction materials and the mating surfaces is, of course, well known in the art.

Likewise, "green roughness", as noted, is a complex concept which results in the driver of the vehicle feeling a vibration in the steering wheel or chassis during braking or a pulsation in the brake pedal. This occurs on the first few braking applications of a new vehicle up to an accumulated mileage of approximately five to ten thousand miles. This roughness can occur when the brakes are at a high temperature, e.g. 400° F., which is termed "hot roughness". Also, "cold roughness" can occur if the rotor or shoe is not carefully machined to have parallel surfaces.

In either case, a major cause of brake roughness is the thickness variation between the two opposing rubbing surfaces. Generally, the larger the thickness variation, the greater the roughness. With this understanding, the art has sought means and methods to overcome this roughness.

First, it has been observed that the preparation of the rotor, per se, in a disc brake system by various machining methods can influence the roughness. Typically, the two preferred methods for finishing the rotor surface are grinding or turning. Grinding the rotor creates radially and circumferentially extending grinding grooves, which are quite uneven resulting in thickness variation. Because of the thickness variation in a ground rotor, there is an uneven friction material transfer during the break-in period which amplifies the vibratory sensation. Turning the rotor creates a spiralling or helical groove configuration with minimal thickness variation. However, grinding is a much lower-cost operation and is preferred from an economic standpoint. Burnishing the rotor can be employed to alleviate the green roughness problem. However, burnishing prior to assembly is not an acceptable manufacturing procedure.

Thus, it is to be appreciated that a major advance in the art would be provided by minimizing green roughness but still using a ground rotor. It is to this to which the present invention is directed.

SUMMARY OF THE PRESENT INVENTION

As noted, the present invention is directed to a method for reducing the roughness encountered during the initial braking applications on a new vehicle or replacement brakes.

Concomitantly, the present invention is also directed to reducing uneven transfer of friction material from one brake component to another so that brake torque variation is minimized during the break-in period.

In accordance herewith the present invention contemplates coating a brake component(s) with a boundary layer friction material. Preferably, the coating is applied to the disc pads of a disc brake system.

Among the useful materials used to coat the brake component are graphite, molybdenum disulfide, divalent fluorides as well as water-based binder materials such as alkyd resins, epoxy resins, phenolic resins and the like. Preferably alkyd resins are employed. Mixtures of the coating materials can be used herein.

The coating of the invention reduces or eliminates braking roughness during the initial wear-in period.

These and other advantages and features of the present invention will become more apparent from the following detailed description when read in conjunction with the accompanying drawing.

A BRIEF DESCRIPTION OF THE DRAWINGS

DETAILED DESCRIPTION OF THE PREFERRED EMBODIMENT

At the outset set it is to be understood that although the present invention is described hereafter within the context of a disc brake system, the present invention is applicable to drum and shoe brake systems also.

Figure 1:
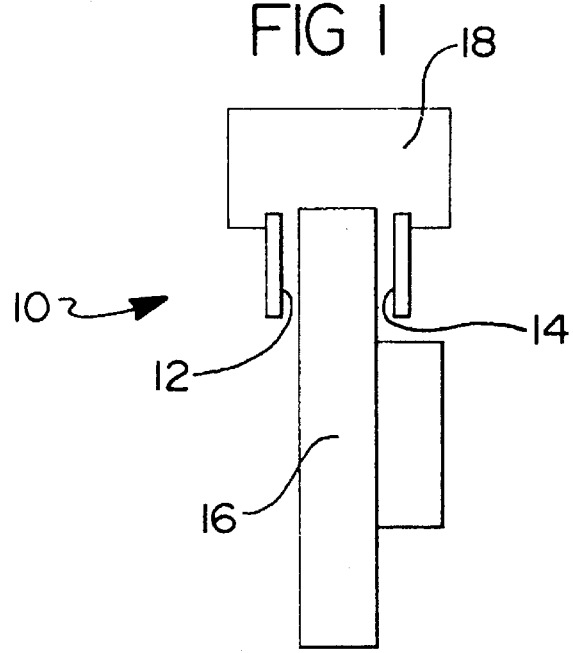
FIG. 1 is a partial front view of a disc brake system.

Referring now to FIG. 1 there is depicted therein a portion of a vehicular disc brake system, generally denoted as 10. The system 10 includes a pair of opposed friction pads 12, 14 located on either side of a rotor 16. The friction pads 12, 14 are mounted in a brake caliper 18.

Figure 2:
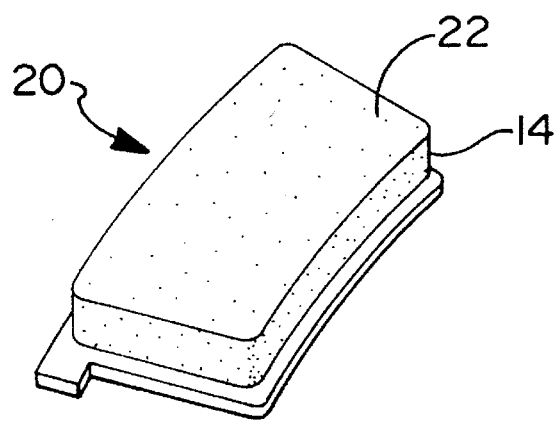
FIG. 2 is a perspective view of a disc brake pad having a coating deposited thereon in accord with the present invention.

In accordance herewith, a coated friction pad 20 is shown in FIG. 2. A coating 22 is applied to a component of the braking system 10, preferably, disc brake pads 12 and 14. It is to be understood that the coating 22 could be applied to either the rotor 16 or the pads 12, 14. However, because the pads 12, 14 comprise a friction material, it is efficacious to coat the pads.

The rotor 16, may be either ground or turned. However, to achieve the full advantages hereof, a ground rotor is contemplated herein. The rotor 16 is usually made of cast iron and is heat treated, phosphated, etc. to achieve the desired wear and corrosion resistance.

As noted, because of rotor thickness variation, the microfinish is uneven during the green period. The present invention causes a material transfer into the gaps in the microfinish, at least until the brakes are worn in. This material transfer, thus, smooths out the grooves, etc.

The coating hereof can be applied by various methods, such as spraying, dipping, vapor deposition or powder coating. Preferably, the coating is sprayed and, then, dried or cured on the pads or other component.

It is to be understood that the coating is preferably transient and only for the green stage, that is, during the wear-in period of the braking system.

Another advantage of the coating is the further prevention of oxidation or rust on the braking components that have been coated. This prevention of oxidation is of particular importance when the brake components are manufactured but are not assembled into the vehicle until some period of time after their manufacture.

In accordance herewith, it has been found that by applying a boundary layer type material to the surface of the friction material, i.e. the disc pads, that ground rotor roughness is reduced. Thus, the coating hereof is a boundary layer transfer material which, during the break-in period, is transferred between from at least one mating part, e.g. the brake pad, to another mating part, e.g. the rotor during brake application to even out the surface thereof, and which does not deter from the efficacy of the friction material.

Among the useful materials are binders, fillers, boundary layer lubricants and other boundary layer materials. Among the useful binders are resinous binders, such as alkyd resins, either clear or pigmented, phenolic resins, styrene-modified phenolic resins, cashew resin, epoxy resin, cornstarch, sodium silicate and the like, as well as mixtures thereof.

Among the useful fillers are sulfates, such as barium sulfate, zinc oxide, mineral clays, such as talc, calcium carbonate and the like, as well as mixtures thereof.

Representative of the useful boundary layer lubricants are graphite, inorganic difluorides, such as barium fluoride and calcium fluoride; mica; phthalo blue, phthalo green; inorganic disulfides, such as molybdenum disulfide, cuprous disulfide; cupric sulfide, molybdenum oxide, zinc metal and the like, as well as mixtures thereof.

The boundary layer material can, likewise, comprise a mixture of binder(s), filler(s) and boundary layer lubricant(s). Preferably, the boundary layer material is applied as a liquid system, either as a water-based system or as a solvent-based system. Preferably, a water-based system is employed.

In practicing the present invention, any boundary layer material that does not impair the friction material and which can transfer material from the pad to the rotor during the break-in period, under automotive break-in period or replacement brake break-in period conditions, can be used. Thus, the material must be capable of evening out the ground rotor surface and not break down during the green period.

In practicing the present invention, the preferred coating material is a clear or pigmented water-based alkyd resin. Typically, an alkyd resin coating is a water-based coating having a polyester binder dispersed therein. Where colored, the resin has pigments and fillers admixed therewith. Likewise, other adjuvants such as corrosion inhibitors may be incorporated therewith. These water-based alkyd resins are well-known and commercially available, such as those available from Sherwin-Williams, Dupont Chemical, Glidden Industries, PPG and the like.

The selected coating is applied to the surface of the component at a thickness varying from about five micrometers to about two hundred micrometers and, preferably, from about ten to about fifty micrometers.

In use, the coating is preferably applied at room temperature by any suitable technique, such as brushing, spraying, dipping, etc. Preferably, where the alkyd resin is employed, it is sprayed onto the pad. Thereafter, the coating is dried either by air drying or by exposure to heat. Typically, the alkyd resin, where used, is oven dried after application to the pad, at a temperature of from about 150° C. to about 200° C. for about ten minutes to about two hours.

The advantage of the present invention is that it reduces the roughness felt by the operator of the vehicle during the brake wear-in period. By coating the brake part(s), roughness can be reduced and consumer complaints of roughness and the feeling of brake shudder is minimized.

For a more complete understanding hereof, reference is made to the following examples. In the examples which are illustrative, and not limitative, all parts are by weight, absent contrary indications.

EXAMPLE I

This example illustrates the coating of a disc pad lining in accordance with the present invention.

A pair of disc brake linings are spray-coated at room temperature with a commercially available black finish alkyd resin[1]. Thereafter, the coated pads are placed in an oven maintained at 180° C. for twenty minutes and then removed therefrom. The so-coated pads are, then, ready for use.

The alkyd resin[1] is prepared by admixing a clear alkyd resin base with suitable pigments and fillers to achieve the desired color. The black coating hereof is achieved by admixing the clear base with the following ingredients:

| Ingredient | Amount, pbw |
|---|---|
| Black iron oxide, pigment | 8.0 |
| Anti-corrosion compound[2] | 6.0 |
| Barium sulfate | 20.0 |
| Talc | 5.2 |
| Balance[3] | 60.8 |

[1] a water-based commercially available black-colored alkyd resin coating.
[2] a mixture of Zn based compounds including ZnO and Zn hydroxy phosphite.
[3] a commercially available clear alkyd resin base with which the above components are mixed.

EXAMPLE II

This example illustrates the preparation of disc pad linings in accordance with the present invention.

Following the procedure of Example I, a disc pad lining was coated with a commercially available gray-colored alkyd resin[1] having the following composition:

| Ingredient | Amount, pbw |
| --- | --- |
| Black iron oxide, pigment | 2.30 |
| Titanium dioxide, pigment | 5.20 |
| Phthalo blue | 0.03 |
| Anti-corrosion compounds[2] | 8.90 |
| Barium sulfate | 17.00 |
| Talc | 5.20 |
| Balance[3] | 61.37 |

[1]same as Example I, except that it is gray colored.
[2]same as Example I.
[3]same as Example I.

EXAMPLE III

This example illustrates alkyd resins useful in the practice of the present invention.

| Ingredient | Amount, pbw | |
| --- | --- | --- |
| | Resin 1[1] | Resin 2[2] |
| Yellow iron oxide, pigment | 1.8 | |
| Black iron oxide, pigment | 0.9 | 0.8 |
| Titanium dioxide, pigment | | 4.7 |
| Phthalo blue | | 0.5 |
| Phthalo green | 0.5 | |
| Anti-corrosion compound[3] | 12.6 | 10.7 |
| Barium sulfate | 19.6 | 19.0 |
| Talc | 5.1 | 5.0 |
| Balance[4] | 59.5 | 59.3 |
| Color | green | blue |

[1]same as Example I, except that it is green colored.
[2]same as Example I, except that it is blue colored.
[3]same as Example I.
[4]same as Example I.

EXAMPLE IV

To test the efficacy of the present invention, a series of disc pad linings are coated with an alkyd resin using the method of Example I.

Thereafter, the so-coated pad linings are measured for coefficient of friction against a base standard of an uncoated lining, using ground rotors. The test was conducted in accordance with JASO P1.

TABLE I

| | TEST RESULTS | | | | |
| --- | --- | --- | --- | --- | --- |
| Specification TEST # | BASE 1 | Coating Ex. I 2 | Coating Ex. II 3 | Coating Ex. II 4 | Coating Ex. I 5 |
| Initial | 0.249– 0.296 | 0.347– 0.382 | 0.344– 0.376 | 0.360– 0.374 | 0.299– 0.362 |
| 1st Effect | | | | | |
| 50 kph | 0.315 | 0.400 | 0.384 | 0.386 | 0.360 |
| 100 kph | 0.307 | 0.337 | 0.333 | 0.331 | 0.357 |
| Burnish | 0.327– 0.393 | 0.322– 0.434 | 0.357– 0460 | 0.350– 0.432 | 0.388– 0.434 |
| 2nd Effect | | | | | |
| 50 kph | 0.348 | 0.355 | 0.372 | 0.352 | 0.355 |
| 100 kph | 0.329 | 0.354 | 0.341 | 0.343 | 0.320 |

TABLE I-continued

| | TEST RESULTS | | | | |
| --- | --- | --- | --- | --- | --- |
| Specification TEST # | BASE 1 | Coating Ex. I 2 | Coating Ex. II 3 | Coating Ex. II 4 | Coating Ex. I 5 |
| 130 kph | 0.339 | 0.334 | 0.325 | 0.326 | 0.309 |
| 1st Fade | | | | | |
| *Min. micro | 0.318 | 0.267 | 0.293 | 0.281 | 0.301 |
| Max. Temp. | 500° F. | 462° F. | 498° F. | 439° F. | 514° F. |
| 2nd Fade | | | | | |
| *Min. micro | 0.337 | 0.324 | 0.320 | 0.319 | 0.333 |
| Max. Temp. | 552° F. | 507° F. | 548° F. | 484° F. | 561° F. |
| 3rd Effect | | | | | |
| 50 kph | 0.376 | 0.391 | 0.386 | 0.386 | 0.398 |
| 100 kph | 0.366 | 0.346 | 0.354 | 0.358 | 0.374 |
| 130 kph | 0.366 | 0.337 | 0.354 | 0.364 | 0.374 |

Ave.
*Test Condition
Inertia: 6.49 kgf m s$^2$
Cylinder Size: ϕ 66
Tire Radius: 305.6
Effective Radius: 111.5 mm
Lining Coefficient at 0.6 G(5.88 m/s$^2$)
Caliper: Lucas 15"

It is to be seen from the above that the alkyd resin greatly enhances the coefficient of friction during the break-in period, thereby, greatly reducing the green roughness.

Having thus described the present invention, what is claimed is:

1. A method of reducing green roughness between mating parts of a multi-component vehicular braking system during brake application, comprising:

coating at least one of the parts of the brake system with a boundary layer material transferable from the at least one part to a mating part during brake application, the coating consisting essentially of an alkyd resin having a filler and a boundary layer lubricant admixed therewith.

2. The method of 1 wherein the alkyd resin is a pigmented alkyd resin.

3. The method of reducing green roughness in the vehicular braking system according to claim 2, wherein the brake system is a disc brake system and the at least one mating part is a pad lining.

4. The method of reducing green roughness in the vehicular braking system according to claim 1, wherein the at least one mating part is a brake drum liner.

5. The method of reducing green roughness in the vehicular braking system according to claim 1, wherein the at least one mating part is a brake shoe.

6. The method of claim 2 wherein the boundary layer material is transferred to a ground rotor.

7. The method of claim 2 wherein:

(a) the filler is selected from the group consisting of zinc oxide, barium sulfate, mineral clays and mixtures thereof; and (b) the boundary layer lubricant is selected from the group consisting of graphite, inorganic difluorides, mica, phthalo blue, phthalo green, inorganic disulfides, molybdenum oxide, zinc oxide and mixtures thereof.

8. The method of claim 7 wherein the coating has a coating is a liquid coating.

9. The method of claim 3 wherein the coating has a thickness ranging from about five micrometers to about two hundred micrometers.

10. The method of claim 1 wherein:

the coating is a water-based pigmented alkyd resin having a filler and a boundary layer lubricant admixed therewith, the coating being applied by spraying at ambient temperature, the method further comprising:

drying the part at about 160° C. to about 200° C. for about ten minutes to about two hours.

11. A method of reducing green roughness during a brake wear-in period of a disc brake system having a brake pad and a ground rotor comprising:

spraying at ambient temperature a coating onto the rotor to fill grooves of the rotor with the coating to overcome uneven friction material transfer from the pad to the rotor during the brake wear-in period, the coating being a water-based pigmented alkyd resin having a filler and a boundary layer lubricant admixed therewith; and then, drying the rotor at a temperature of about 160° C. to about 200° C. for about ten minutes to about two hours.

* * * * *